July 29, 1941.  A. O. BUCKIUS  2,250,853
JOURNAL BOX
Filed July 21, 1936  4 Sheets-Sheet 1

INVENTOR
*Albert O. Buckius*
BY
*Clarence D Kerr*
ATTORNEY

July 29, 1941. A. O. BUCKIUS 2,250,853
JOURNAL BOX
Filed July 21, 1936 4 Sheets-Sheet 2

INVENTOR
*Albert O. Buckius*
BY *Clarence D Kerr*
ATTORNEY

July 29, 1941.      A. O. BUCKIUS      2,250,853
JOURNAL BOX
Filed July 21, 1936      4 Sheets-Sheet 3
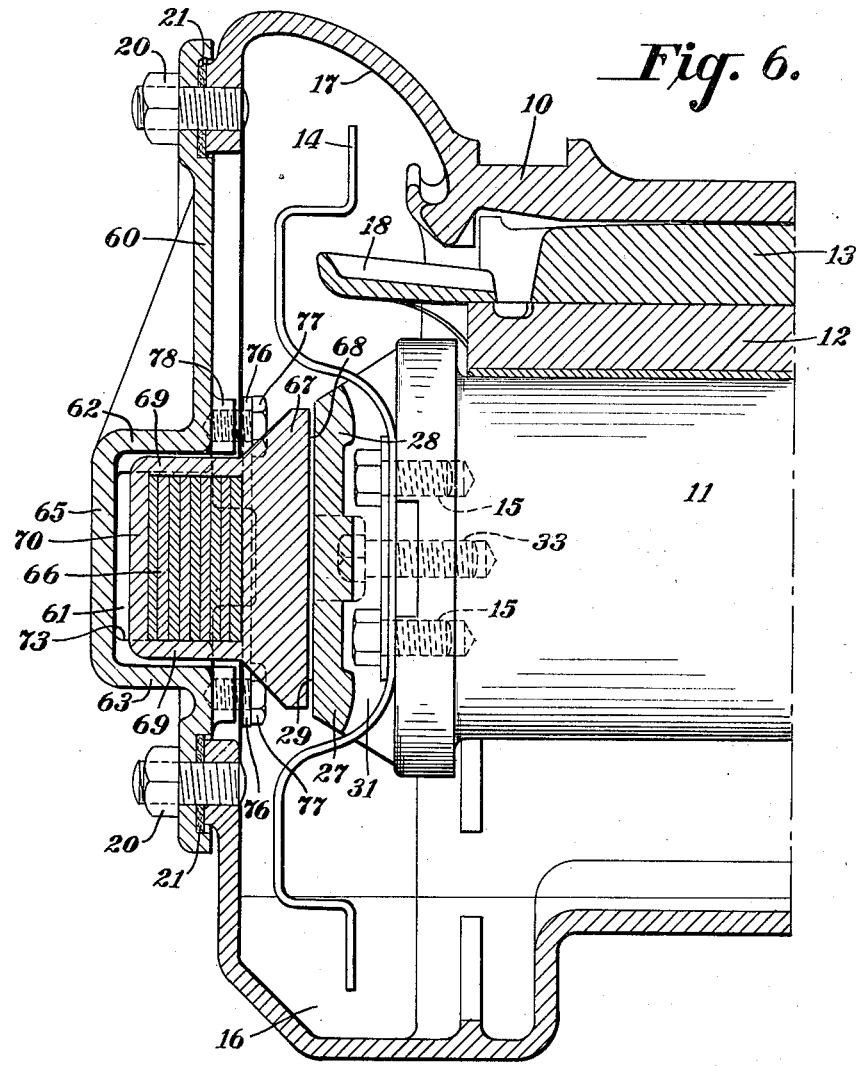
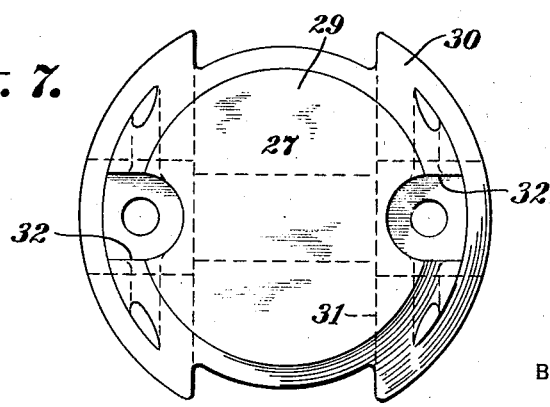
INVENTOR
*Albert O. Buckius*
BY
*Clarence D Kerr*
ATTORNEY July 29, 1941.  A. O. BUCKIUS  2,250,853
JOURNAL BOX
Filed July 21, 1936  4 Sheets-Sheet 4
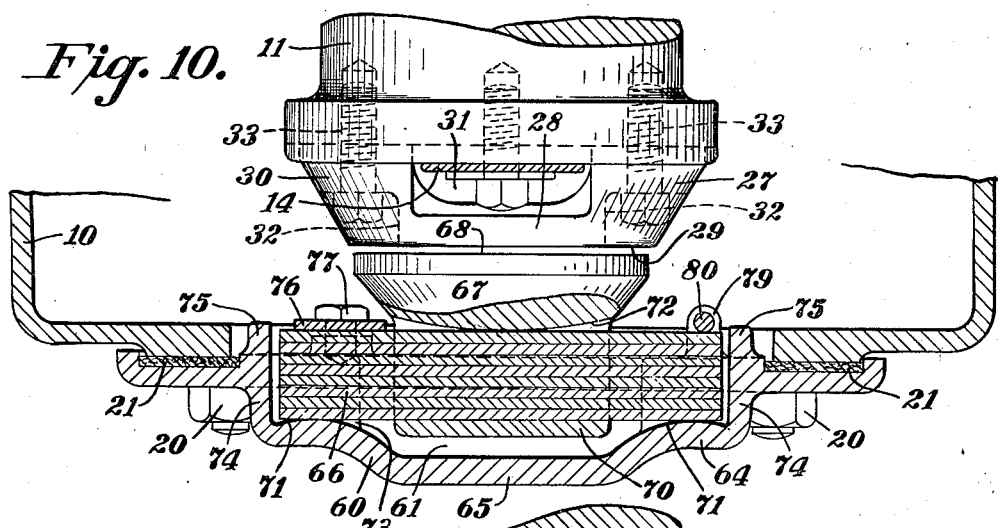
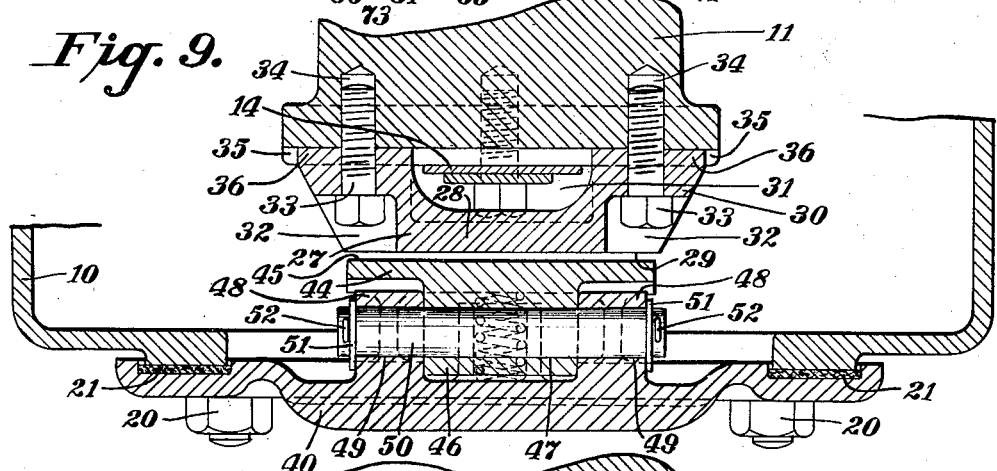
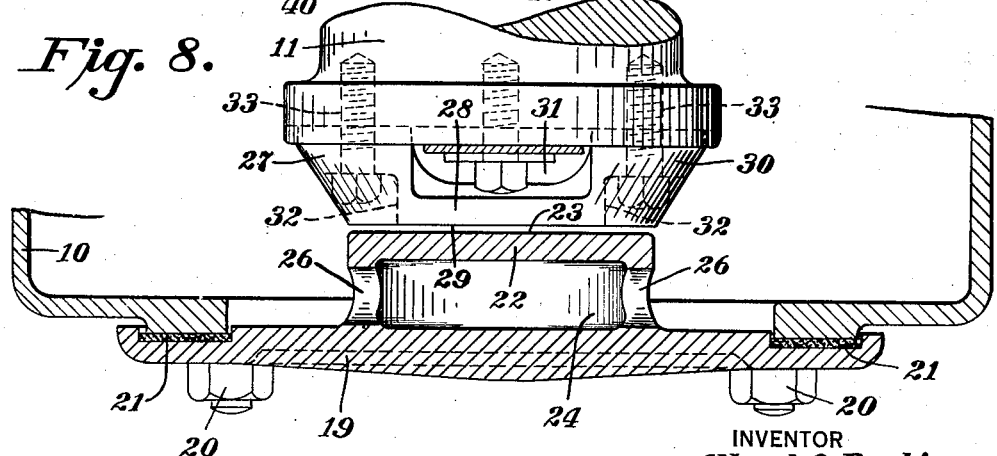
INVENTOR
*Albert O. Buckius*
BY
*Clarence D Kerr*
ATTORNEY Patented July 29, 1941

2,250,853

UNITED STATES PATENT OFFICE 2,250,853

JOURNAL BOX

Albert O. Buckius, Cleveland Heights, Ohio, assignor to National Malleable and Steel Castings Company, Cleveland, Ohio, a corporation of Ohio Application July 21, 1936, Serial No. 91,690

12 Claims. (Cl. 308—41)

This invention pertains to means for receiving the end thrust of a journal used in a railway journal box, and more particularly concerns an end thrust arrangement for use in a journal box equipped with what is generally termed a free oiling system in which a member is mounted on the end of the journal.

In journal boxes of this type movement of the journal relative to the journal box is ordinarily limited in one direction by means of a collar on the end of the journal which contacts the end of the brass or bearing member positioned between the journal and the top of the journal box. Movement of the brass relative to the journal box in the same direction is limited by cooperating stop lugs on the journal box and bearing member. Relative movement of these parts in the opposite direction is limited by cooperation of corresponding surfaces at the opposite end of the journal and on the opposite journal box. In such an arrangement the bearing area between the journal collar and the brass is insufficient to stand up under present-day service conditions wherein train speeds are constantly being increased. Furthermore, as wear takes place between the journal collar and brass, the amount of lateral movement of the car increases and results in too much side sway of the car to give good riding qualities. In journal boxes having an oil conveying member on the end of the journal the wear between the journal collar and brass may soon develop to such an extent that the member becomes damaged by contact with the walls or other parts of the journal box. As a result, oiling of the bearing surfaces is impaired or entirely stopped with consequent heating of the journal or the development of a hot box.

One object of my invention is the provision of end thrust means between the end of the journal and the journal box of sufficient area to insure adequate protection to the free oiling system and accurate control and limitation of lateral movement even under the increased speeds and other requirements of present-day service conditions. Another object is the provision of means on the end of the journal bridging the oil conveying member so that the end thrust can be transmitted to the end face of the journal. A still further object of my invention is a novel thrust block construction for assuring surface contact between the thrust block and the bridge member on the end of the journal. In connection with this thrust block, I provide means for normally maintaining the thrust surface on the block out of contact with the bridge member. My invention also contemplates a novel arrangement whereby the thrust block is resiliently mounted in the journal boxes to thereby eliminate or absorb the hammer blows between the journal and thrust block such as may be normally encountered when the car gives a sudden lurch laterally. Other objects and features of my invention will be in part apparent and in part pointed out in conjunction with the accompanying drawings, in which:

Figure 6 is a longitudinal vertical sectional view through the forward end of a journal box showing another modification of my invention.

Figure 7 is a front face view of the bridge member.

Figure 8 is a partial horizontal sectional view on the horizontal center line of the journal box shown in Fig. 2.

Figure 9 is a partial horizontal sectional view on the horizontal center line of the journal box shown in Fig. 4, and Figure 10 is a partial horizontal sectional view on the horizontal center line of the journal box shown in Fig. 6.

Figure 1:
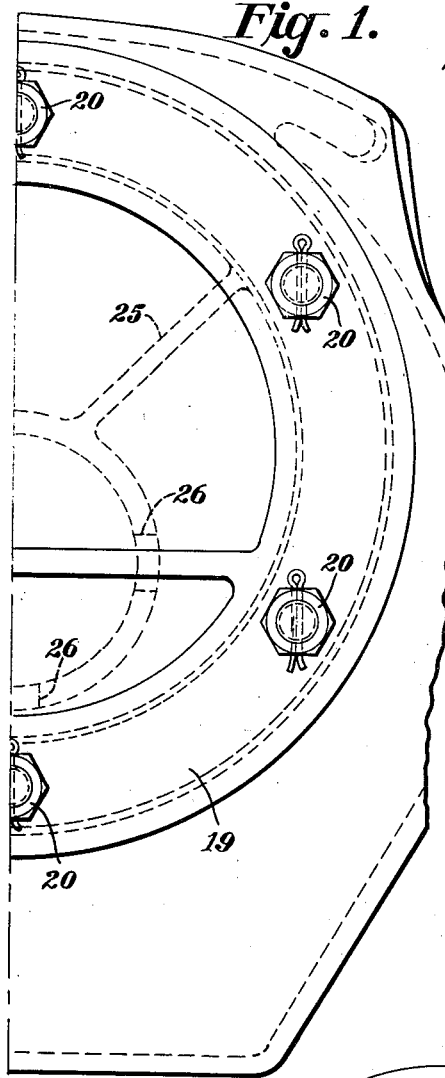
Figure 1 is a partial end view of a journal box embodying my invention.
Figure 2:
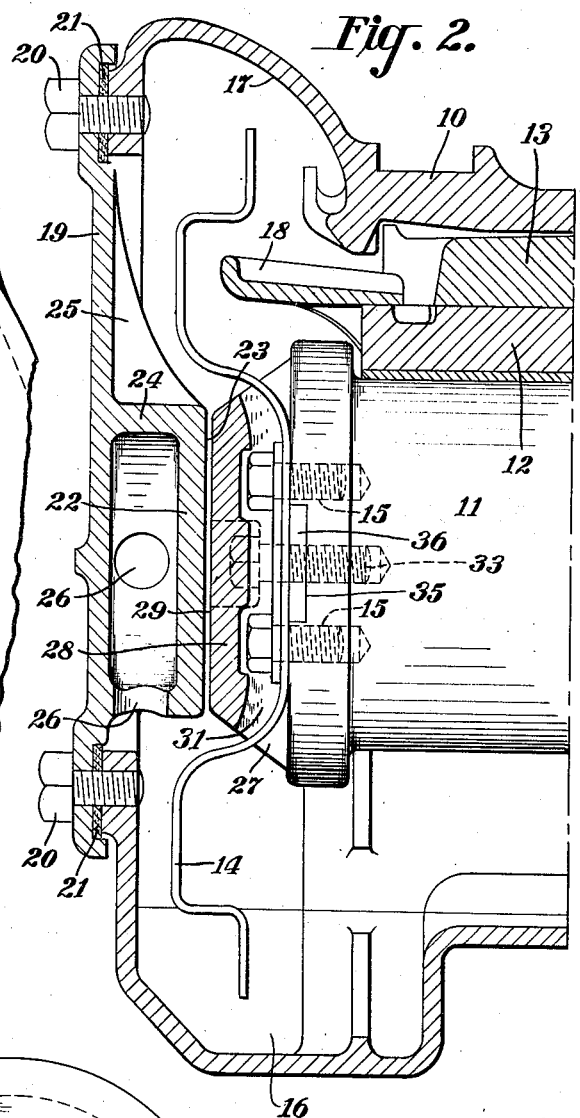
Figure 2 is a longitudinal vertical sectional view through the forward end of the journal box.
Figure 3:
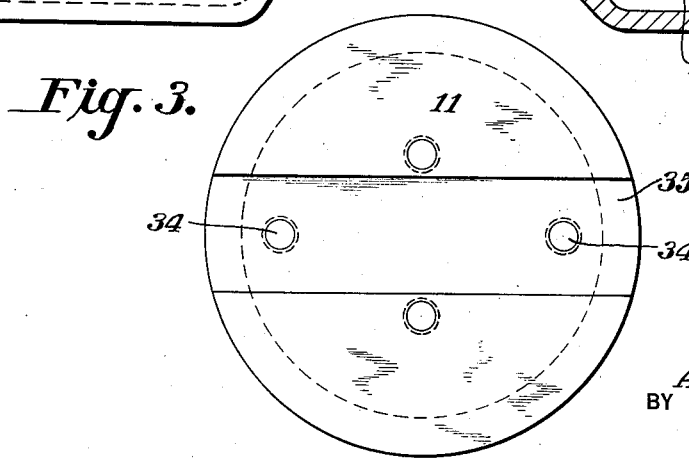
Figure 3 is an end view of the journal, showing the slot therein for receiving the bridge member.

In the drawings like reference numerals refer to similar parts. Referring particularly to Figs. 1 and 2 there is shown a journal box 10, a journal 11 extending into the box, and a brass or bearing member 12 and a wedge 13 positioned between the journal and the top of the box. An oil conveying member 14 is secured to the end of the journal by means of bolts 15 and dips into and picks up oil from the reservoir 16 at the bottom of the box; this oil is either thrown onto an upper wall 17 of the box, from which it flows or drops by gravity into a groove 18 in the bearing member 12, or it drops directly by gravity from member 14 into the groove 18, from which groove it flows through suitable channels to the surfaces to be lubricated. A cover 19 is secured to the end of the journal box by suitable means, such as bolts 20, and a gasket 21 serves to maintain an oil-tight joint between the cover and the opening in the end of the journal box.

In the form of the invention shown in Figs. 1 and 2, I provide end thrust receiving means integral with the cover, which means comprise a substantially vertical wall 22 having a thrust surface 23 facing the journal. The wall 22 is joined to the inner surface of the closure member by a cylindrical wall 24 and may be further reinforced by upwardly extending webs 25. Only one of the webs 25 is shown in Fig. 1 since it is only a half view, but it will be understood that a similar web may be provided on the opposite side of the journal box that is not shown, and, if desired, a greater number may be employed.

Openings 26 are formed in the cylindrical walls 24 to enable support of the core used in the molding operation. Rather than taking the end thrust directly on the bolts 15 that hold the oil conveying member 14 in place, I provide novel means for bridging the bolts and member so as to present a substantial area adapted to contact the thrust surface 23 of the closure member. This bridge member 27 is shown in vertical section in Fig. 2, in horizontal section in Fig. 9, and in front elevation in Fig. 7, and comprises an end wall 28 having a substantially vertical thrust surface 29 facing the surface 23. Formed integral with the wall 28 is a substantially circular base portion 30 which is formed with a diametrically extending passage or groove 31 of sufficient size to permit the thrust block 27 to bridge the oil conveying member 14. The outer face of wall 28 is recessed on either side of the groove 31, as at 32, to receive the heads of the bolts 33, which bolts extend into threaded holes 34 in the journal to secure the bridge member to the end of the journal. In view of the fact that the journal is rotating when the thrust surfaces 23 and 29 engage, there will be a tendency for the bridge member to twist relative to the journal because of the friction developed between the thrust surfaces, which twisting action would place a shearing stress on the bolts 33. I prefer, however, to relieve the bolts of any shearing stress and for this purpose form a slot 35 in the end of the journal for receiving the extreme inner portions 36 of the base 30, formed as projections in line with the recesses 32. By providing clearance between the bolts 33 and the bolt receiving holes in the member 27, the shearing stresses will be taken between the walls of the slot and the walls of the projections on the base member. It will be understood that a similar thrust member is used in the journal box receiving the end of the journal on the opposite side of the car and that movement of the journal to the right as viewed in Fig. 2 will be taken on the opposite thrust block.

Figures 4, 5:
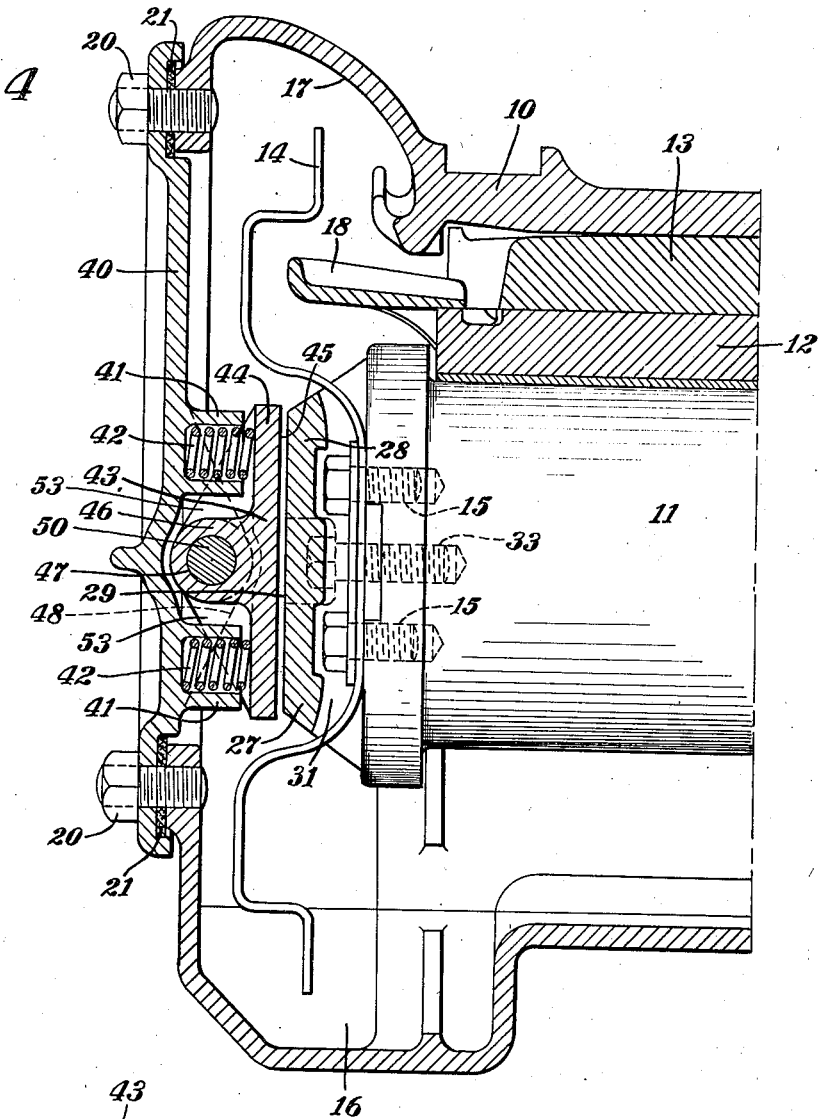
Figure 4 is a longitudinal vertical sectional view through the forward end of a journal box showing a modification of my invention.
Figure 5 is an elevational view showing the forward face of the thrust block shown in Fig. 4.

Referring to Figs. 4, 5 and 9 there is shown a slightly different form of thrust block mounted on the closure member 40. On the inner wall of the closure member are formed cylindrical housings 41 receiving coil springs 42 that bear at one end against the inner wall of the housings and at the other end against a thrust block 43. The thrust block has an outer wall 44 formed with a thrust surface 45 facing the thrust surface 29 of bridge member 27, which is the same as the one previously described in connection with Figs. 1 and 2. Extending outwardly from wall 44 is a projection 46 provided with a horizontally extending opening 47. Extending inwardly from the closure member on either side of projection 46 are projections 48, each of which is formed with an opening 49 in line with the opening 47. A pin 50 extends through openings 47 and 49 for pivotally mounting the thrust block on the closure member. The pin may be secured in place as by washers 51 and cotter pins 52. The projection 46 on the thrust block may be reinforced by webs 53 joining the projection with the wall 44. It will be apparent that the springs 42 maintain the thrust block so that the thrust surface 45 is substantially vertical and normally out of contact with surface 29 on the bridge member. Without the springs the thrust block would tip until the upper part of surface 45 contacted with the bridge member, which would result in unnecessary wear. When the journal moves outwardly relative to the box and contacts the thrust block, the latter will pivot about the pin 50 to whatever extent may be necessary to permit the thrust surfaces 45 and 29 to engage each other over practically their entire extents, thus assuring the maximum area of contact available for wear between the two surfaces.

In Figs. 6 and 10 there is shown a thrust block resiliently mounted in the journal box so as to absorb the shocks due to lateral thrusts, thus eliminating hammer blows between the parts and improving riding qualities. In this form the closure member 60 is provided with a horizontal recess 61 formed of upper and lower walls 62 and 63 respectively, and a vertical wall 64 joining the walls 62 and 63. The vertical wall 64 may be spaced farther from the closure member at the central portion thereof, as at 65, to provide ample room for a band, to be later described, surrounding a leaf spring 66 mounted in the recess 61. The thrust block 67 has a thrust surface 68 facing the thrust surface 29 on the bridge member 27 and is provided with outwardly extending horizontal walls 69 and a vertical wall 70, which together with the thrust block form the spring band, above referred to, for confining the leaves of the leaf spring 66. At each end of the recess 61 the wall 64 of the closure member is formed with curved seats 71 for the ends of the leaf spring. Sufficient clearance is maintained between the wall 70 of the spring band and the offset portion 65 of wall 64 of the closure member to permit the desired amount of outward movement of the thrust block. Clearance is also provided between the thrust block and the inner side of the leaf spring, except for substantially a line contact along the transverse center line of the spring by curving the thrust block, as at 72.

The bottom wall 63 of recess 61 may be raised at each end, as at 73, so as to support the leaf spring at its ends, leaving ample clearance between the spring band and the part of the wall directly below it. The end walls 74 of the recess are shown projected inwardly at 75 so as to overlap the ends of the leaf spring.

Suitable means may be provided for maintaining the spring in the recess. At the left of Fig. 10 and in Fig. 6 there is shown a plate member 76 extending across the end of the leaf spring to prevent it from moving toward the journal. This member is secured to the cover by bolts 77 entering threaded holes in bosses 78 formed integral with the closure member. Another form of securing means is shown at the right of Fig. 10 in which lugs 79 project inwardly from the top and bottom of the recess and are provided with openings for receiving a cotter pin 80. It will be understood that either form of securing means may be used on both sides of the recess to maintain the spring in place.

It will be appreciated that outward thrusts of the journal relative to the box will be absorbed by the friction between the leaves of the leaf spring and at the same time the spring will permit the thrust block to adjust itself so as to present surface contact between the thrust surfaces on the block and bridge member.

While I have shown the several embodiments of my invention in connection with a free oiling type of journal box, since it is especially adapted for use in such a box, it will be apparent to those skilled in the art that certain features may be used in other types of journal boxes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a device of the class described a journal box having an oil reservoir at the bottom thereof, a journal extending into said box, a member secured to and rotating with said journal and adapted to convey oil from said reservoir to a point for delivery to said journal, a thrust block on the end of said journal having portions bridging said member and normally out of contact therewith and having other portions thereof radially outward of said member interlocked with said journal, and a thrust receiving surface on said box adapted to be engaged by said thrust block to limit outward movement of said journal relative to said box.

2. In a device of the class described a journal box having an oil reservoir at the bottom thereof, a journal extending into said box, a member rotating with said journal and adapted to convey oil from said reservoir to a point for delivery to said journal, said member having a substantially flat center portion secured to the journal, a thrust block on the end of said journal having a center portion spaced from the flat portion of said member and inwardly extending end portions interlocked with the journal, a closure member on the end of said box and a thrust receiving surface on said closure member adapted to be engaged by said thrust block to limit outward movement of said journal relative to said box.

3. In a device of the class described a journal box having an oil reservoir at the bottom thereof, a journal extending into said box, a member secured to said journal and rotating therewith for conveying oil from said reservoir to a point for delivery to said journal, a thrust block secured to the end of said journal, said thrust block being recessed on the side facing the journal so as to provide clearance between said block and member, and thrust receiving means on said box adapted to be engaged by said thrust block to limit outward movement of said journal relative to said box.

4. In a journal box having an opening in the forward end thereof, a journal extending into said box, a closure member for said opening, inwardly extending lugs on said closure member, a thrust block having a projection adapted to be pivotally mounted on said lugs, and spring means above and below said pivotal mounting for maintaining the thrust receiving surface on said block substantially parallel with the adjacent end of the journal.

5. In a journal box having an opening in the outer end thereof, a journal extending into said box, a closure member for said opening, a thrust block pivotally mounted on said closure member and having a thrust surface adapted to be engaged by said journal to limit outward movement thereof, said closure member having pockets extending toward said thrust block, and spring means in said pockets for normally maintaining the thrust receiving surface of said block out of contact with said journal.

6. In a journal box having an opening in the outer end thereof, a journal extending into said box and having a thrust receiving surface, a closure member for said opening, said closure member having a pocket opening toward said journal, leaf spring means in said pocket, means adjacent each end of said leaf spring means limiting movement of said spring means toward said journal, and a thrust block mounted on said spring means and adapted to cushion outward movements of said journal relative to said box, said thrust block having means thereon surrounding said leaf spring for limiting movement of said thrust block toward said journal.

7. In a journal box having an opening in the outer end thereof, a journal extending into said box and having a thrust receiving surface, a closure member for said opening, said closure member having a pocket opening toward said journal, leaf spring means in said pocket, a thrust block mounted on said spring means and adapted to cushion outward movements of said journal relative to said box, and means limiting movement of said thrust block toward said journal.

8. In a journal box having an opening in the outer end thereof, a journal in said box having a thrust receiving surface, a closure member for said opening secured to said box, said member having an inwardly facing pocket, leaf spring means in said pocket, a spring band surrounding said leaf spring means, and a thrust block projecting from said spring band toward said journal and having a thrust receiving surface adapted to cooperate with the thrust receiving surface of said journal to cushion outward movements of the latter relative to the box and having a surface engaging said spring means substantially on the longitudinal center line of said journal, said surface curving away from said spring means on each side of said center line.

9. In a journal box having an opening in the outer end thereof, a journal extending into said box, a closure member for said opening secured to said box, said member having a transversely extending pocket, a leaf spring mounted in said pocket, means surrounding said leaf spring adapted to hold the leaves of said spring in assembled relation, means adjacent the ends of said leaf spring for limiting movement thereof toward said journal, and a thrust block associated with said first named means adapted to be engaged by said journal to cushion outward movements thereof relative to said box, the outer wall of said pocket being spaced from said first named means to permit outward movement thereof relative to said closure member.

10. In a device of the class described a journal box, a journal extending into said box, said journal having a thrust receiving surface at its end, thrust receiving means mounted on said box in line with said surface on the journal, said means being rockable with relation to said box to enable flat surface engagement with the end of the journal at all times, and resilient means extending through said thrust receiving means and coacting therewith to normally maintain the latter in a central position angularly with relation to the box.

11. A journal box having an oil reservoir at the bottom thereof, a journal in said box, a member rotating with said journal adapted to convey oil from said reservoir to a point for delivery to said journal, said journal having a slot extending across the outer face thereof, a thrust block having portions entering said slot and portions facing said journal spaced from said member, and means radially outwardly of said member for securing said thrust block to said journal.

12. A journal box having an oil reservoir at the bottom thereof, a journal member in said box, an element rotating with said member adapted to convey oil from said reservoir to a point for delivery to said journal, a thrust receiving member, one of said members having a recessed end portion and the other of said members having a portion extending into said recess, said thrust receiving member having portions facing the journal spaced from said element, and means radially outwardly of said element for securing said thrust receiving member to said journal member.

ALBERT O. BUCKIUS.